United States Patent
Lyon et al.

(10) Patent No.: US 9,285,471 B2
(45) Date of Patent: Mar. 15, 2016

(54) METHOD AND APPARATUS FOR LOCALIZATION OF RFID TAGS

(75) Inventors: Geoff M. Lyon, Menlo Park, CA (US); Salil Pradhan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2482 days.

(21) Appl. No.: 11/285,370

(22) Filed: Nov. 21, 2005

(65) Prior Publication Data

US 2007/0115137 A1 May 24, 2007

(51) Int. Cl.
  *G08B 5/22* (2006.01)
  *G01S 13/76* (2006.01)
  *G06K 17/00* (2006.01)

(52) U.S. Cl.
  CPC ....... *G01S 13/767* (2013.01); *G06K 2017/0045* (2013.01)

(58) Field of Classification Search
  CPC ... G01S 13/767; G01S 13/878; G08B 3/1083; G08B 13/2462; G06K 2017/0045; G07C 9/00111
  USPC .................................................. 340/825.49
  See application file for complete search history.

(56) References Cited

U.S. PATENT DOCUMENTS

| | | | |
|---|---|---|---|
| 3,755,803 A | | 8/1973 | Cole et al. |
| 5,528,232 A | * | 6/1996 | Verma .............. G01S 13/74 33/714 |
| 5,539,394 A | | 7/1996 | Cato et al. |
| 5,686,902 A | | 11/1997 | Reis et al. |
| 5,838,257 A | * | 11/1998 | Lambropoulos ... G07C 9/00309 340/10.33 |
| 5,959,568 A | * | 9/1999 | Woolley .............. G01S 5/0289 235/385 |
| 6,958,677 B1 | * | 10/2005 | Carter ..................... 340/10.1 |
| 2004/0252015 A1 | * | 12/2004 | Galperin ............ G06K 19/0723 340/5.64 |
| 2005/0068169 A1 | * | 3/2005 | Copley ............... G08B 21/0283 340/539.13 |

FOREIGN PATENT DOCUMENTS

| | | |
|---|---|---|
| JP | 2005-140637 | 2/2005 |
| JP | 2005-293485 | 10/2005 |
| WO | WO03/061366 | 7/2003 |

* cited by examiner

*Primary Examiner* — Omer S Khan

(57) ABSTRACT

A method and apparatus for an RFID tag to facilitate the determination of its location while at the same time minimizing the energy drain on the tag's battery. At predetermined intervals, the tag transmits its identifier along with status information. If the status indicates that the tag is in a new location, the tag will then expend additional battery energy by participating in the determination of its location. The distance from an interrogator to the tag is determined by transmitting two signals from the interrogator that propagate at different velocities. By determining the difference in arrival times at the tag of the two signals, the distance from the interrogator to the tag can be determined.

19 Claims, 8 Drawing Sheets

US 9,285,471 B2

METHOD AND APPARATUS FOR LOCALIZATION OF RFID TAGS

BACKGROUND

A tag serves to identify the thing to which it is attached. Many products today are identified with RFID tags. The RFID tag has gained popularity as a way to identify products because it speeds checkout processing and aids automatic inventory management. The RFID tag is attached to an object and then scanned or "interrogated" using radio frequency electromagnetic waves emitted from an interrogator. Interrogating the RFID tag with radio wave allows the interrogator to be out of direct line-of-sight of the tagged item and to be located at a greater distance from the item than is permitted with other approaches such as optical scanning.

Typically, an RFID tag system includes one or more interrogators and an RFID tag for each item to be tracked. The interrogator includes a radio transmitter to send signals to the RFID tag and a radio receiver to receive signals sent back from the RFID tag. The interrogator can also typically be connected to a network so that the information from the various RFID tags can be centrally gathered and processed.

The RFID tag typically includes an antenna and an integrated circuit chip. Depending upon the radio frequency, the antenna can be anywhere from just a few turns to a few hundred turns of wire. The integrated circuit chip can include the radio transmitter and receiver functions along with data storage. The data stored on the chip can range from a simple product identifying number to extra identifying data to further identify the object itself. It is also possible for data to be written into the chip from various interrogators. For example, the location history of a product can be written into an RFID tag as the tagged product is moved from the store room to the sales area and perhaps to other associated retail outlets.

RFID tags are typically classified as either active or passive. Passive tags derive their energy from the interrogating radio signal and are generally limited in application to product checkout where the tagged item can be placed in proximity to the interrogator's antenna. Active tags contain a small battery as an energy source and can broadcast a radio signal over a greater range.

Tracking tagged items with RFID is valuable to retailers because it reduces manual receiving and inventory management procedures. Products can be tracked automatically from distribution centers to storerooms and from storerooms to the store's retail area. Interrogators in the retail area can provide real time indication of low stock or misplaced items and speed customer checkout. For example, the store clerk can accelerate the checkout process as they are not required to individually process each of the items a customer brings to the checkout counter. Simply placing the items in the vicinity of the interrogator is all that is typically needed to interrogate the RFID tags and checkout items.

It is also desirable to know the precise location of a tagged object. Range to a tagged object can be estimated by measuring the propagation time of a radio signal sent to and from a tag. Further accuracy can be obtained by subtracting the known circuit delays of the interrogator's transmitter and receiver along with those of the RFID tag.

Even with multiple conventional interrogators operating, finding a precise tag location to within a few centimeters is problematic. Expensive hardware is needed to accurately process radio waves traveling at the speed of light. For example, radio waves, which propagate at approximately 30 centimeters per nanosecond, require a 1-gigahertz counter to locate an RFID tag to within 30 centimeters. Less expensive counters operating at lower frequencies have a higher degree of granularity and suffer from even greater uncertainty in precisely locating a tag.

Unfortunately, circuitry operating at gigahertz rates is not only expensive, but typically consumes a lot of power and is difficult to design. Power consumption remains a problem in conventional RFID tag systems. Constant monitoring of a tag may identify the location of a tag but it will eventually dissipate the tag's battery. A dead battery in a tagged item is tantamount to a missing item. Replacing tag batteries is costly in terms of both labor and materials and is generally not an option.

Accordingly, there is a need for a system to precisely determine the positions of a number of RFID tags while addressing the aforementioned problems.

BRIEF DESCRIPTION OF THE DRAWINGS

The present invention is illustrated by way of example and not limitation in the figures of the accompanying drawings in which.

Like reference numbers and designations in the various drawings indicate like elements.

SUMMARY OF THE INVENTION

Figure 1:
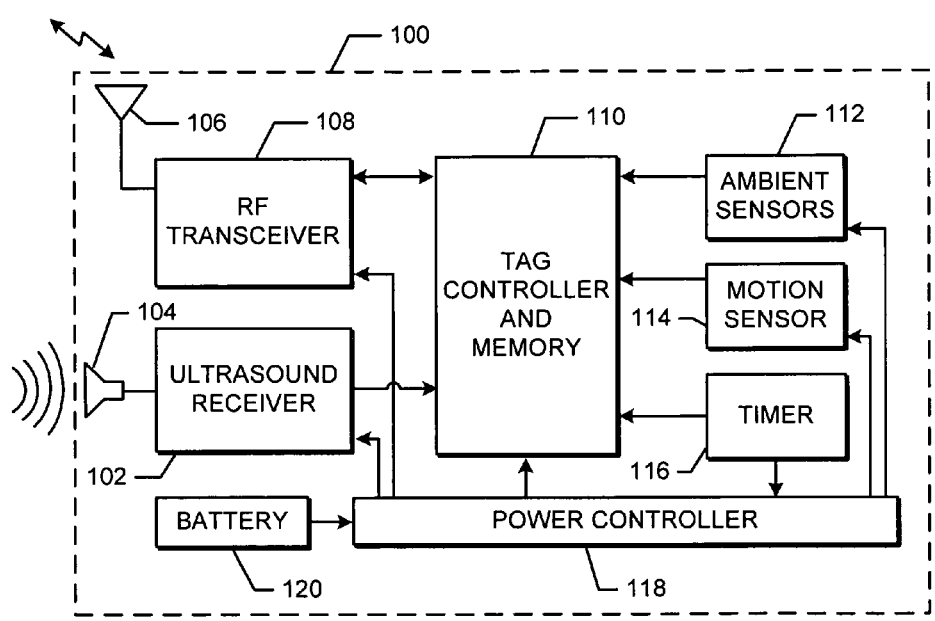
FIG. 1 is a schematic diagram illustrating the system organization of an active RFID tag in accordance with one implementation of the present invention.

One aspect of the present invention features a method for a tag to facilitate determining its location. The location determination includes transmitting at a predetermined time interval from the tag an identifier associated with the tag, determining if tag has been moved to a different position using one or more sensors associated with the tag and expending energy from the tag responsive to the movement determination as the tag participates in an operation that locates the tag in the different position.

Another aspect of the present invention features a method for an interrogator to determine a tag location. The interrogator determines the tag location by receiving at a predetermined time interval from the tag an identifier associated with the tag, receiving an indication that the tag has changed position; and performing a location operation in response to the indication that the tag has changed position.

DETAILED DESCRIPTION

Aspects of the present invention are advantageous in at least one or more of the following ways.

Implementations of the present invention improve the accuracy of locating products. The physical locations of products tagged and tracked in accordance with the present invention can be accurately tracked in real time. This is valuable information to retailers interested in keeping their inventories up-to-date and readily locatable. Further, tracking the product positions using RFID tags of the present invention enables the retailer to quickly count the existing stock and locate misplaced items. This allows the retailer to avoid using conventional inventory systems, which are often expensive, labor-intensive, time-consuming, and sometimes inaccurate.

Tracking the position of tagged items is also advantageous outside the retail environment. For example, there is a need to accurately track the location of portable emergency equipment used in hospitals and other venues. Locating a misplaced hospital "crash cart" more quickly can help save lives and improve patient care. Similarly, military installations may contain various assets important to national defense. Losing track of the location of certain items could have an impact on national security. Accordingly, there is a need to continuously monitor the disposition of these and other high value assets.

Implementations of the present invention are also advantageous in conserving battery life in active RFID tags. Unlike passive RFID tags, active RFID tags typically carry their own energy source in the form of a small battery. One aspect of the present invention keeps the tag circuitry in a low-power "sleep" mode with the tag's receiver listening for a "wakeup" signal from an interrogator. Another aspect of the present invention instead uses a low-power counter in the tag to wakeup the tag periodically and spontaneously broadcast its information to any interrogator within signal range. Both of these approaches conserve energy and extend battery life.

Increased communication ranges commensurate with those found in either a warehouse or retail environment makes implementations of the present invention advantageous in RFID communication. A longer battery life means that the RFID device can transmit both longer distances and for longer periods of time between recharges. By conserving battery life, the RFID tag designed in accordance with the present invention in larger geographic areas or ranges.

Implementations of the present invention conserves the tag's battery by locating a tag's position only after a tag has changed position. For example, a tag may change position when the object it is attached to is moved to a different area or warehouse. This avoids battery dissipation due to unnecessary position location operations while the tag is moving. Once the tag's position and the object it is attached to has stopped moving, the tag can be placed in a low-power sleep mode where it is only interrogated at infrequent intervals. This conserves the energy stored in the tag's battery.

A further advantage of the present invention is the ability to precisely locate objects without expensive hardware. By propagating two signals with different propagation velocities and comparing their arrival times at the object, the distance to the object with a tag from the source of the signals can be accurately determined. By incorporating a second signal propagating at a much slower rate, such as a sound wave, the tag's position can be precisely determined with circuitry operating at a much slower clock frequency than is required for radio signals. This circuitry is more cost effective and is easier to implement than circuitry operating at gigahertz clock rates used in conventional solutions.

FIG. 1 is a schematic diagram illustrating the system organization of an active RFID tag 100 in accordance with one implementation of the present invention. An ultrasound receiver 102 conveys an ultrasound signal received by a microphone 104 to a tag controller and memory 110. Radio signals can be both sent and received by an RF transceiver 108 via an antenna 106. Radio signals to be sent come from tag controller and memory 110 and likewise, received radio signals from RF transceiver 108 are conveyed to tag controller and memory 110. Tag controller and memory 110 also receives signals from one or more ambient sensors 112, a motion sensor 114 and a timer 116. Power from a battery 120 is distributed to the various components via a power control circuit 118 controlled by timer 116 and tag controller and memory 110.

The distance from an interrogator to tag 100 is determined by measuring the propagation time of an ultrasound signal traveling between the interrogator and tag 100. The signal is first received by microphone 104 whereupon the sound energy is converted into an electrical signal and sent to ultrasound receiver 102. Among its various functions, ultrasound receiver 102 conditions the electrical signal in preparation for processing by tag controller and memory 110. In accordance with implementations of the present invention, turning on the power to ultrasound receiver 102 when tag 100 expects to receive an ultrasound signal conserves the energy of battery 120. In one implementation, tag 100 typically expects to receive an ultrasound signal once the tag has been moved and subsequently has become stationary. For example, tag 100 can detect when it has been moved from one location in a warehouse to another location in the warehouse.

Motion sensor 114 works with tag controller and memory 110 and timer 116 to determine displacement of the tag from one position to another. Implementations of the present invention maintain tag movement information without continuous application of power to motion sensor 114. Instead, energy in battery 120 is conserved by "strobing" power to motion sensor 114 for a few microseconds every several seconds or at a rate that is adequate to detect motion. This keeps the duty cycle and thus the power drain of motion sensor 114 on battery 120 very low.

Similarly, tag 100 periodically transmits the tag's identification and status via RF transceiver 108 and antenna 106 at a low frequency rate to conserve the energy of battery 120. For example, the status information being transmitted by tag 100 includes the states: "static," indicating no change in location from when the previous transmission was made; "moving," indicating that the tag is in motion from one location to another; and "new location," indicating that the tag is in a new location and no longer moving. Occurrence of this last condition generally further indicates that the tag location needs to be determined and/or reported to an interrogator. These status states also help conserve battery energy in accordance with implementations of the present invention and are further described later herein.

Optionally, one or more ambient sensors 112 can be included with tag 100. These ambient sensors 112 allow the environment of the tagged item to be monitored periodically. Environmental conditions monitored may include temperature, humidity, and ambient light. For example, it may be necessary to maintain the storage temperature of certain perishable items within a prescribed range. Other products such as leather goods might require maintaining the humidity in a certain range. Ambient sensors 112 may read these conditions infrequently because environmental parameters generally change slowly. For example, ambient sensors can read the environment conditions each time the tag sends its status to the interrogator if the slower changing environmental parameters generally do not change in the interim.

Tag controller and memory 110 can be a conventional microcontroller with different types of memory. In one implementation, read-only memory (ROM) can be used for program storage and to store the identification code of the individual tag, while random-access memory (RAM) is can be used for temporary data storage. If computational requirements allow, a simple microcontroller can be used that does not require significant power to operate. For example, an 8-bit or even a 4-bit microcontroller may provide sufficient computational power for use in tag controller and memory 110. An important objective in choosing the microcontroller is to accomplish all of the tag's functions while at the same time minimizing the energy consumption by the microcontroller.

Power control 118 is a series of electronic switches under control of both timer 116 and tag controller and memory 110. These switches route power from battery 120 to the various components. During sleep mode, power controller 118 turns off power to a majority of the circuitry except for timer 116. Periodically, timer 116 causes power controller 118 to power up tag controller and memory 110 in order to send the tags status to the interrogator. When the controller is ready to transmit, power controller 118 directs power to RF transceiver 108 in order to broadcast the tag's identification and status. In one implementation of the present invention, once the transmission completes, all circuitry but timer 116 is again powered down.

Battery 120 is sized according to the power requirements of the tag. Minimizing the use of functions that require power can conserve the energy of battery 120 and facilitate the use of smaller, less costly batteries.

Figure 2:
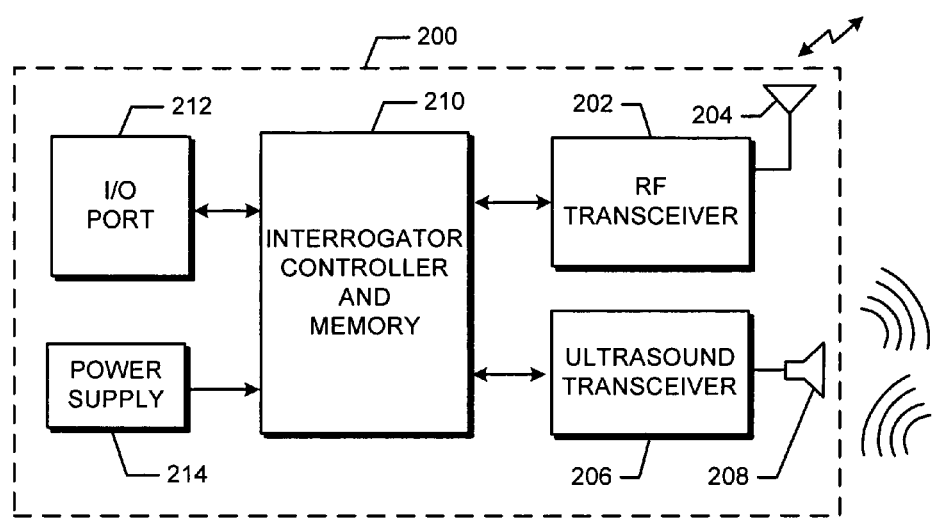
FIG. 2 is a schematic diagram illustrating the system organization of an active RFID tag interrogator in accordance with one implementation of the present invention.

FIG. 2 is a schematic diagram illustrating the system organization of an active RFID tag interrogator 200 in accordance with one implementation of the present invention. An interrogator controller and memory 210 is connected to an I/O port 212, an RF transceiver 202 transmitting and receiving through an antenna 204 and an ultrasound transceiver 206 sending and receiving ultrasound signals through an ultrasound transducer 208. Power supply 214 provides power to operate the various aforementioned components.

In one implementation, interrogator controller and memory 210 is implemented as a conventional microprocessor system with a memory for storing the main control program and data along with the power-on initialization routine. Compared with tag 100 in FIG. 1, the data processing requirements for the interrogator are generally greater due to a greater number of complex operations it may be required to perform. For example, the interrogator may be required to communicate with other interrogators when multiple interrogators are used to locate a tag's position.

In general, the problem of locating a tag in an arbitrary volume of space may require as many as four interrogators operating together. The distance or "range" from each interrogator to a particular tag defines a radius of a sphere. The surface of the sphere represents all possible locations for the tag. Combining two intersecting spheres from two interrogators defines a ring of possible tag locations. Adding a third intersecting sphere from yet a third interrogator isolates two possible points on the ring. Finally, a fourth intersecting sphere from a fourth interrogator selects one of the two points as the tag location.

However, in practice, the interrogators are generally mounted in a plane on the ceiling and the range to the tag forms a radius of a hemisphere rather than the radius of a sphere. In a similar manner to the above example, two intersecting hemispheres describe an arc and a third intersecting hemisphere locates a single point on the arc. Accordingly, using more than three interrogators may increase the certainty of the tag's position, but may not always be necessary.

I/O port 212 allows the interrogators to be connected into a network and share data with other devices and computers. As previously described, the interrogators cooperate in determining a tag's location. In one implementation, each interrogator determines the radius from the interrogator to the tag and then shares this information with a computer connected to other interrogators and responsible for determining the tag's position.

RF transceiver 202 transmits and receives data to and from the tags via antenna 204. Transceiver 202 can be designed to be more powerful and sensitive than those of the tags since transceiver 202 is not necessarily limited by power consumption or overall size.

Ultrasound transceiver 206 sends and receives ultrasound signals through ultrasound transducer 208. Similar to RF transceiver 202, the design of ultrasound transceiver 206 is not necessarily limited by power consumption or overall size. The receiver in ultrasound transceiver 206 characterizes the geometry of the interrogator array in accordance with implementations of the present invention as only the interrogators send ultrasound signals. Tags designed in accordance with implementations of the present invention do not typically interfere with this process as the tags receive but do not send ultrasound signals.

Figure 3:
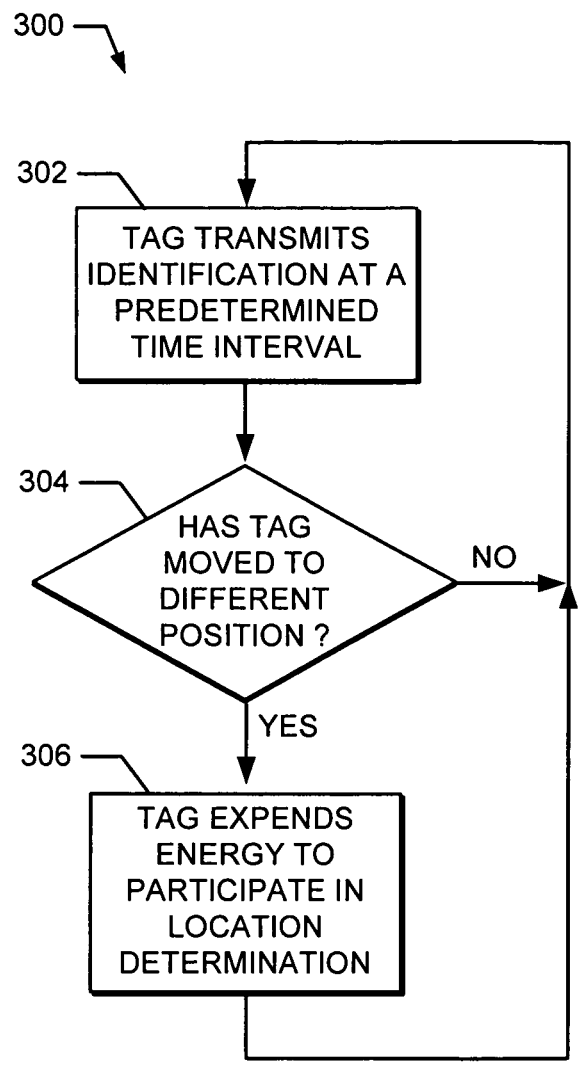
FIG. 3 is a flowchart diagram of the operations to facilitate locating an active RFID tag in accordance with one implementation of the present invention.

FIG. 3 is a flowchart diagram of the operations to facilitate locating an active RFID tag 300 in accordance with one implementation of the present invention. As previously described, the tag contains a timer circuit used to initiate the transmission of the tag's identification at a predetermined time interval (302). The identification information generally also includes status information on the tag's operation.

In accordance with one implementation of the present invention, the tag's status is transmitted each time the tag has moved to a different position (304). One or more motion sensors associated with the tag help determine if the tag has moved or is currently moving. If the tag has not moved, then the location determination operation is not performed as the tag status is "static". Many other types of status can be provided as previously described. For example, other status that can be provided aside from "static," (indicating no change in location from when the previous transmission was made) include "moving," indicating that the tag is in motion from one location to another; and "new location," indicating that the tag is in a new location and no longer moving.

If the status shows that the tag has been moved to a new position, then the tag expends energy and participates in the process to determine its new location (306). As previously described, the determination of a tag's location involves the sending and receiving of radio signals as well as actively listening for ultrasound signals from the one or more interrogators. In one implementation, a newly positioned tag interacts with at least three interrogators and therefore expends more battery energy than would have been required had it not been moved.

Figure 4:
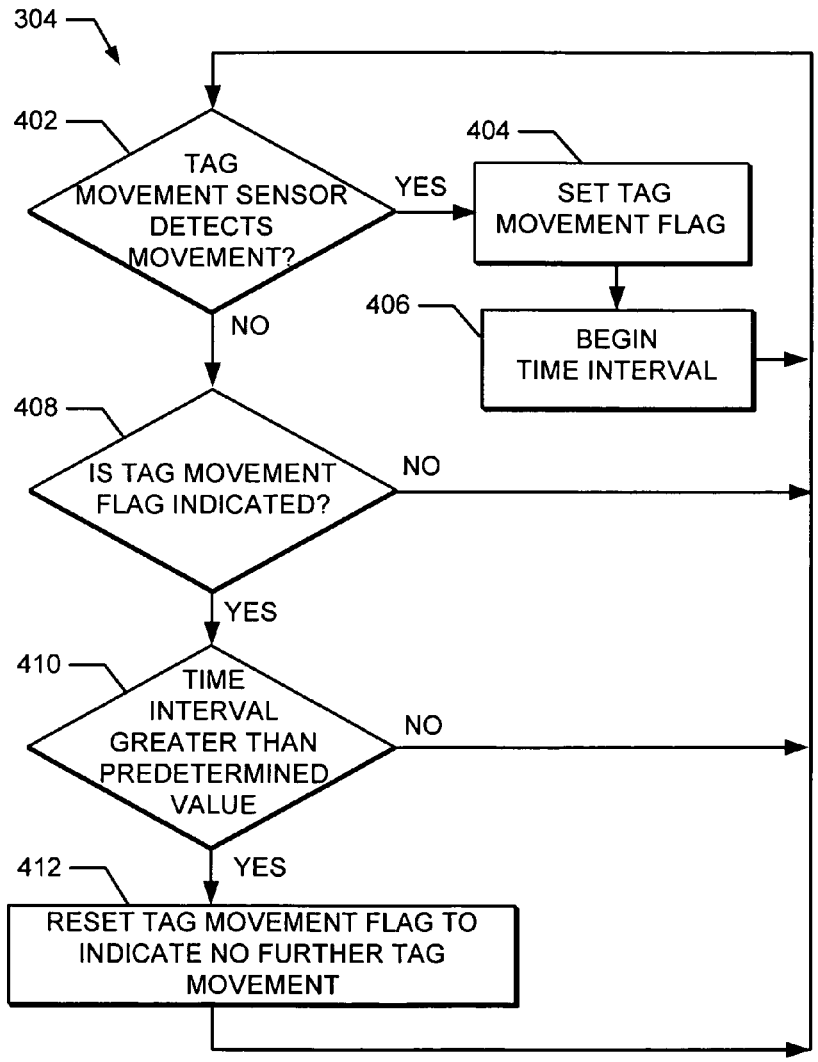
FIG. 4 is a flowchart diagram of the operations to determine movement of an active RFID tag in accordance with one implementation of the present invention.

FIG. 4 is a flowchart diagram of the operations to determine movement of an active RFID tag 304 in accordance with one implementation of the present invention. To conserve battery energy, the tag requests a location determination after it has moved to a new location. The tag determines that it is in a new location after there has been no movement indication from the movement sensor for a predetermined time interval.

Initially, the tag movement sensor associated with the tag determines if the tag has moved (402). If there is an indication of movement from the tag movement sensor then a tag movement flag is set within the tag (404). When the movement flag is set, the tag is determined to be in motion and a time interval measurement begins (406). For example, the status of the tag at this point in processing is considered "moving" during the time interval. The time interval measurement is restarted (406) each time a tag movement indicator (402) occurs as the tag is considered to be in motion and not stationary.

Implementations of the present invention also to continue to test for tag movement when the tag movement sensor does not indicate movement (408). However, each tag movement indication is retained until the time interval exceeds a predetermined value and it is reset. This latter condition effectively indicates that the tag is in motion at some point before the time interval elapses.

As long as there was some tag movement indicated, then the time interval is checked to determine if it has exceeded a predetermined value (410). If the time interval is greater than the predetermined value then the tag is assumed to be at rest in a new position, the movement tag is reset indicating no present movement (412). Implementations of the present invention presume that movement has stopped, as the tag and object have not moved for the time interval. The tag movement sensor continues to be checked (402) in the event that the tag and its associated object should be moved elsewhere.

Figure 5:
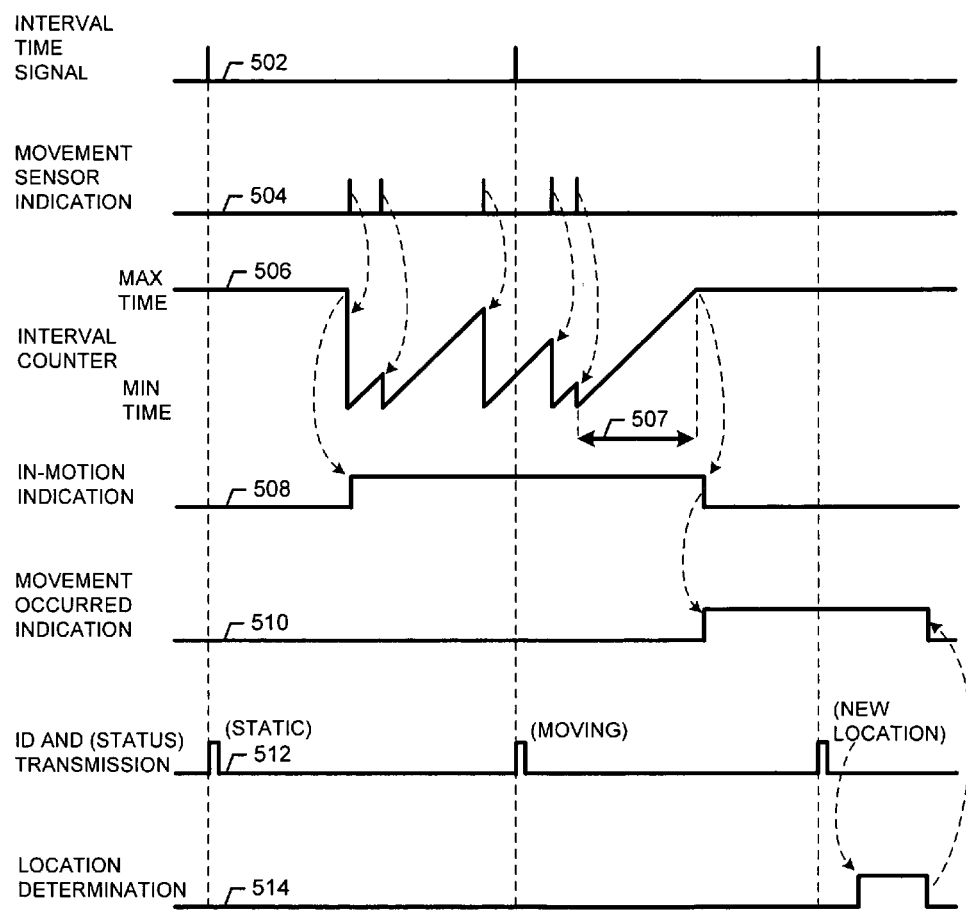
FIG. 5 is a timing diagram illustrating the location determination of an active RFID tag in accordance with one implementation of the present invention.

Now, with reference to FIG. 5, an example timing diagram illustrates the location determination of an active RFID tag in accordance with one implementation of the present invention. The timing diagram includes the following signal indications: an interval time signal 502, marking the occurrence of a first predetermined time interval; a movement sensor indication 504 showing the movement of a tag object; an interval counter 506, displaying its value between a minimum time value and a maximum time value; a second predetermined time interval 507; an in-motion indication 508; a movement occurred indication 510; an identification and status transmission indication 512; and a location determination indication 514.

As previously described, the tag first determines that it is in motion before battery energy is expended to determine a tag's location. When no motion has occurred for second predetermined time interval 507, the tag status indicates that motion has ceased and that it is in a new position. The tag's identification and status are transmitted at first predetermined time intervals 512, determined by interval time signals 502.

Movement sensor indication 504 shows a positive spike upon receiving an indication of movement. In this example, 5 different movements of a tag and object have been detected in accordance with implementations of the present invention. Each indication of movement causes the interval counter 506 to be set to its minimum time value. The indication of movement also sets the in-motion indication signal 508. New motion signals from the movement sensor reset the interval counter. This effectively causes the interval time for motion cessation determination to always be measured from the most recently received motion indication. The movement sensor signals also set in-motion indication signal 508. In one implementation, the in-motion indication signal 508 indicates that the tag is moving via the tag status that is transmitted at a first predetermined interval as previously described.

If there have been no motion sensor signals for the second predetermined time interval 507, then the in-motion indication signal 508 is reset and the movement occurred indication 510 is set, indicating there has been no movement for a predetermined time interval. The tag's status 512 can now indicate that the tag is in a new position and no longer moving.

For example, the tag status indicating that the tag is in a new position causes the interrogators to begin the process of determining the tag's location 514 in accordance with implementations of the present invention. The movement occurred indication 510 is reset and subsequent status then indicates that the tag is static, i.e., not moving.

It is generally desirable to minimize energy drain on the tags' batteries. However, it is recognized that there are special cases where it is desirable to have a high-visibility mode that effectively monitors the real-time position of a tagged object even as it is in motion and even to the detriment of energy drain on the battery. For example, a hospital "crash cart" containing critical life-saving equipment may be in motion many times during the day. It is advantageous to monitor the precise location in real time of equipment such as this and schedule replacement of batteries for the cart and devices more frequently.

Figure 6:
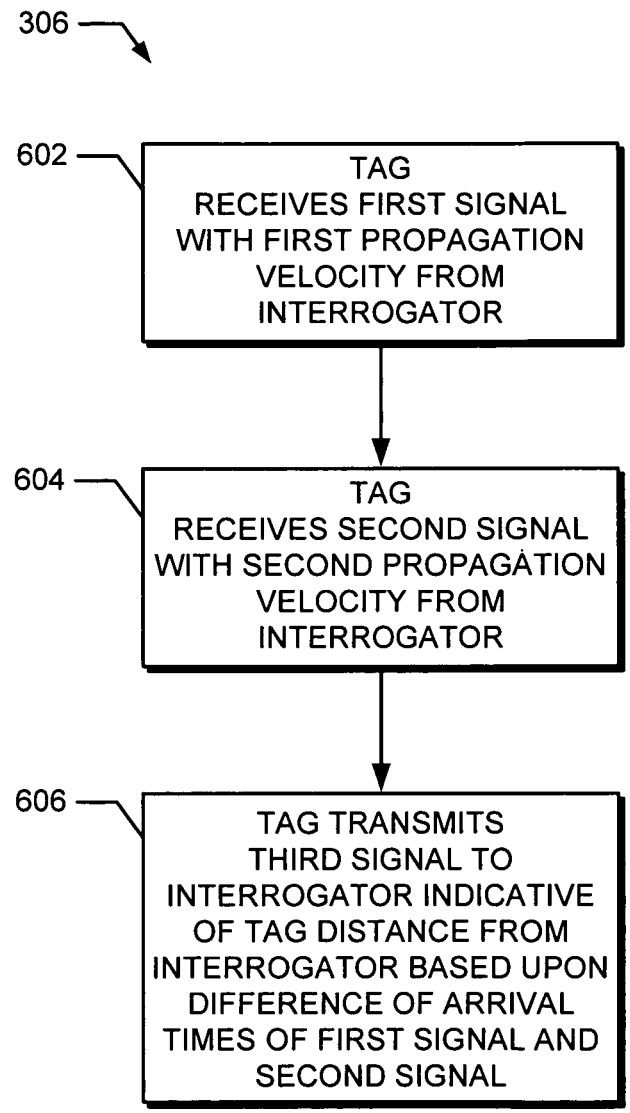
FIG. 6 is a flowchart diagram of the operations for determining the distance of an active RFID tag from an interrogator in accordance with one implementation of the present invention.

Now turning to FIG. 6, a flowchart diagram of the operations for determining the distance between an RFID tag and an interrogator 600 in accordance with one implementation of the present invention. The tag in this case is associated with an identifier whose tag status indicates that the tag has been moved. The distance from the interrogator to the tag is calculated from different types of waves propagating at different velocities. By knowing the propagation velocities of each wave type, the distance from the interrogator to the tag can be calculated from the difference in the wave arrival times at the tag from waves broadcast at essentially the same time.

Initially, the tag receives a first signal sent from the interrogator with a first propagation velocity (602). At this point the tag begins to measure the time until the arrival of a second signal propagating at a different velocity. For example, the first signal could be a radio signal propagating at approximately $3 \times 10^8$ meters per second. The second signal could be a sound signal propagating through air at approximately $3.3 \times 10^2$ meters per second. The ratio of the two velocities is on the order of one million, so any distance error introduced by ignoring the travel time of the radio signal results in an error of approximately one part in a million.

At some later point in time, the tag receives the second signal sent from the interrogator traveling at a second propagation velocity (604). If this signal were a sound wave propagating through air as in the example above, then the time interval measured from the arrival of the first signal to the arrival of the second signal can be taken to be indicative of the distance from the interrogator to the tag. The distance is the propagation velocity of sound in air at the temperature of the air in the interrogator-tag environment multiplied by the time interval measured from the arrival of the first signal to the arrival of the second signal.

In one implementation, the tag then transmits a third signal to the interrogator indicative of the distance form the interrogator to the tag (606). This signal is based upon the difference in arrival times of the first and second signals. In yet another implementation of the present invention, the tag simply responds with an acknowledgement of receipt of the second signal wherein the calculation of the signal propagation time is performed by the interrogator. Carrying out these operations with three or more interrogators enables the interrogators to locate the tag with increasing accuracy.

Figure 7:
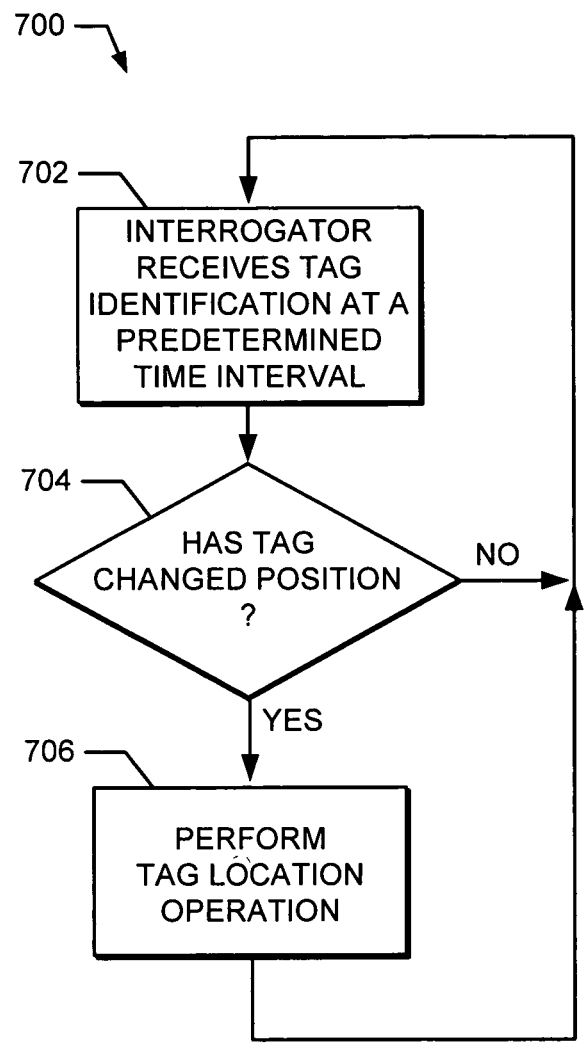
FIG. 7 is a flowchart diagram of the operations for an interrogator to determine the location of an active RFID tag in accordance with one implementation of the present invention.

Referring now to FIG. 7, a flowchart diagram of the operations for an interrogator to determine the location of an active RFID tag 700 in accordance with one implementation of the present invention. As previously described, the tag conserves its battery energy by performing location operations when the tag and its associated object are moved to a new location. From the perspective of an interrogator, a tag's position is not determined until the tag makes it evident to the interrogator that the tag's position has changed by transmitting status as appropriate.

Initially, the interrogator receives a tag identification signal from the tag at a predetermined time interval (702). A status signal may also be associated with this identification signal. As previously described, an exemplary status signal could be comprised of one of the three following conditions: "static," indicating that the tag has not changed position since the previous identification signal transmission; "moving," indicating that the tag is currently in motion; and "new location," indicating that the tag is in a new location and its position has not yet been determined.

In one implementation, the interrogator determines if the tag has changed position through further analysis of the received information (704). For example, a "new location" tag status from the tag indicates that the tag is in a new location. If the tag has not changed position, then no location operation is performed. If the tag has changed position, then the interrogator performs a tag location operation (706). Otherwise, the interrogator continues to receive tag identification and other information at predetermined time intervals (702).

Figure 8:
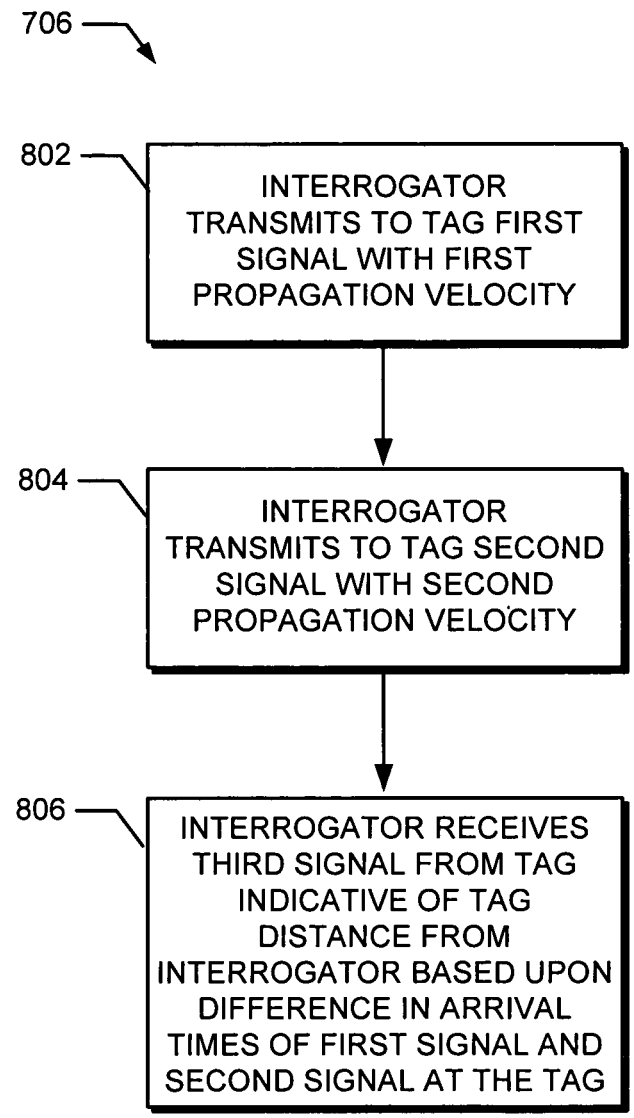
FIG. 8 is a flowchart diagram of the operations to determine the distance of an RFID tag from an interrogator in accordance with one implementation of the present invention.

FIG. 8 a flowchart diagram of the operations to determine the distance of an RFID tag from an interrogator 706 in accordance with one implementation of the present invention. These operations explain the tag location operation (706) in greater detail. The tag location operation is typically comprised of three or more distance determination operations used in conjunction with different corresponding interrogators.

Initially, an interrogator transmits to the identified tag a first signal with a first propagation velocity (802). As previously described, the interrogator transmits the first signal when the tag status indicates that the tag is in a new location. In one implementation, the first signal is a radio wave transmitted at a known point in time and arrives at the tag at a first time.

The interrogator then transmits to the identified tag a second signal having a second propagation velocity that arrives at the tag at a second time (804). In one implementation, the second signal is an ultrasound wave propagating through air and transmitted at a known point in time in relation to the first signal.

The interrogator then receives a third signal from the tag indicative of the tag distance from the interrogator. This tag distance is based upon the difference in arrival times at the tag of the first and second signals (806). This third signal can be in a variety of forms.

For example, the tag can accurately calculate the distance in meters, feet, etc. and transmit this distance value back to the interrogator. In this implementation, the tag knows the delay between the transmission of the first and second signals, the difference in arrival times at the tag, and the air temperature of the interrogator-tag environment. While this is a direct solution, it places an extra computational burden on the tag and results in extra drain on the tag's battery.

In another implementation, the tag can send a counter value back to the interrogator and let the interrogator perform the distance calculation using the counter value. In this implementation, the tag starts counting at a known rate upon the arrival of the first signal and stops counting upon arrival of the second signal and then sends the differential count value back to the interrogator. This approach represents less computational burden on the tag and therefore less battery dissipation. In a variation of this approach, computational requirements can further be reduced along with dissipation of battery power. In this variation, the tag's controller reads the tag's timer upon receipt of each of the first and second signals and then transmits the difference of the timer values back to the interrogator.

In yet another alternative implementation, the tag responds with a radio signal upon receipt of the second signal, relying upon the interrogator to determine the time difference between the arrival of the first and second signals. This alternative greatly reduces the computational requirements of the tag and therefore reduces the drain on the battery due to computation by tag's controller.

While specific embodiments have been described herein for the purposes of illustration, various modifications may be made without departing from the spirit and scope of the invention. Accordingly, the invention is not limited to the above-described implementations, but instead is defined by the appended claims in light of their full scope of equivalents.

What is claimed is:

1. An RFID tag capable of assisting in a determination of its location, comprising:
   a timer to periodically generate a signal at a predetermined time interval;
   a controller to be powered up upon receiving the periodically generated signal from the timer;
   a radio frequency (RF) transceiver to send an identifier associated with the RFID tag at the predetermined time interval from the RFID tag in response to the powering of the controller by the periodically generated signal from the timer;
   a motion sensor to determine whether the RFID tag has been moved to a different position, wherein to determine whether the RFID tag has been moved comprises:
      receiving a first indication of movement from the motion sensor;
      receiving a time interval signal measured according to the first indication of movement;
      receiving a second indication that movement is occurring;
      receiving a third indication that movement has not occurred for a predetermined time period; and
      determining that the RFID tag has ceased movement according to the second indication that movement is occurring and the third indication that movement has not occurred for the predetermined time period; and
   an ultrasound receiver to receive signals traveling at a second velocity compared with a first velocity of signals received by the transceiver that determines a location of the RFID tag in a new position responsive to the motion sensor.

2. The RFID tag of claim 1, further comprising: a tag movement flag to indicate a stationary status or in-motion status of the RFID tag, wherein when there is an indication of movement from the motion sensor, the RFID tag movement flag is set to indicate the in-motion status of the RFID tag and a time interval measurement is started by the timer.

3. The RFID tag of claim 2, wherein when the time interval measurement is greater than a time threshold, the RFID tag movement flag is reset to indicate the stationary status of the RFID tag.

4. The RFID tag of claim 1, wherein when the RFID tag is in motion, the transceiver is to send, to an interrogator, an indication of movement of the RFID tag.

5. The RFID tag of claim 2, wherein when the RFID tag movement flag indicates the stationary status of the RFID tag, the RF transceiver is to send, to an interrogator, the stationary status of the RFID tag.

6. The RFID tag of claim 1, wherein the RF transceiver is to receive from an interrogator a first signal having a first velocity that arrives at the RFID tag at a first time, receive from the interrogator a second signal having a second velocity that arrives at the RFID tag at a second time, and transmit to the interrogator a third signal indicative of the distance between the RFID tag and the interrogator based upon a difference between the arrival times of the first and second signals.

7. The RFID tag of claim 6, wherein the first signal is a radio signal and the second signal is an ultrasound signal.

8. A method for an RFID tag to facilitate a determination of its location, wherein the RFID tag includes a timer, a controller, a radio frequency (RF) transceiver, a motion sensor, and an ultrasound receiver, the method comprising:

periodically generating, by the timer, a signal at a predetermined time interval;

powering up the controller in response to the periodically generated signal from the timer;

sending, by the RF transceiver, an identifier associated with the RFID tag at the predetermined time interval from the RFID tag in response to the powering of the controller;

determining, by the motion sensor, if the RFID tag has been moved to a different position, wherein the determining comprises:

receiving a first indication of movement from the motion sensor;

receiving a time interval signal measured according to the first indication of movement;

receiving a second indication that movement is occurring;

receiving a third indication that movement has not occurred for a predetermined time period; and determining that the RFID tag has ceased movement according to the second indication that movement is occurring and the third indication that movement has not occurred for the predetermined time period; and receiving, by the ultrasound receiver, signals traveling at a second velocity compared with a first velocity of signals received by the RF transceiver that determines a location of the RFID tag in a new position responsive to the motion sensor.

9. The method of claim 8, further comprising:

setting a tag movement flag to indicate an in-motion status of the RFID tag when there is an indication of movement from the motion sensor, and starting, by the timer, a time interval measurement.

10. The method of claim 9, further comprising:

resetting the RFID tag movement flag to indicate a stationary status of the RFID tag when the time interval measurement is greater than a time threshold.

11. The method of claim 8, further comprising:

sending to an interrogator an indication of movement of the RFID tag when the RFID tag is in motion.

12. The method of claim 8, further comprising:

sending to an interrogator an indication of stationary status of the RFID tag in response to a determination by the motion sensor that the RFID tag is stationary.

13. The method of claim 8, further comprising:

receiving from an interrogator a first signal having a first velocity that arrives at the RFID tag at a first time; and receiving from the interrogator a second signal having a second velocity that arrives at the RFID tag at a second time; and transmitting to the interrogator a third signal indicative of the distance between the RFID tag and the interrogator based upon a difference between the arrival times of the first and second signals.

14. An RFID tag device comprising:

a timer to periodically generate a signal at a predetermined time interval;

a controller to be powered up upon receiving the periodically generated signal from the timer;

a radio frequency (RF) transceiver to send an identifier associated with the RFID tag device at the predetermined time interval in response to the powering of the controller by the periodically generated signal from the timer;

a motion sensor to determine if the RFID tag device has been moved to a different position, wherein to determine if the RFID tag device has been moved comprises:

receiving a first indication of movement from the motion sensor;

receiving a time interval signal measured according to the first indication of movement;

receiving a second indication that movement is occurring;

receiving a third indication that movement has not occurred for a predetermined time period; and determining that the RFID tag has ceased movement according to the second indication that movement is occurring and the third indication that movement has not occurred for the predetermined time period; and an ultrasound receiver to receive signals traveling at a second velocity compared with a first velocity of signals received by the RF transceiver that determines a location of the RFID tag device in a new position responsive to the motion sensor.

15. The RFID tag device of claim 14, further comprising: a tag movement flag, wherein when there is an indication of movement from the motion sensor, the RFID tag movement flag is set and a time interval measurement is started by the timer.

16. The RFID tag device of claim 15, wherein when the time interval measurement is greater than a time threshold, the RFID tag movement flag is reset.

17. The RFID tag device of claim 14, wherein when the RFID tag device is stationary, the RF transceiver is to send to an interrogator an indication of stationary status of the RFID tag device.

18. The RFID tag device of claim 14, wherein the RF transceiver is to:

receive from an interrogator a first signal having a first velocity that arrives at the RFID tag device at a first time, and receive from the interrogator a second signal having a second velocity that arrives at the RFID tag device at a second time, wherein the controller is to determine a distance between the RFID tag device and the interrogator based upon a difference between the arrival times of the first and second signals, and wherein the RF transceiver is to transmit to the interrogator a third signal indicative of the distance between the RFID tag device and the interrogator.

19. The RFID tag device of claim 18, wherein the first signal is a radio signal and the second signal is an ultrasound signal.

* * * * *